United States Patent
Isatake et al.

(10) Patent No.: US 11,946,768 B2
(45) Date of Patent: Apr. 2, 2024

(54) INFORMATION PROCESSING APPARATUS, MOVING BODY, METHOD FOR CONTROLLING INFORMATION PROCESSING APPARATUS, AND RECORDING MEDIUM

(71) Applicant: CANON KABUSHIKI KAISHA, Tokyo (JP)

(72) Inventors: Kenji Isatake, Kanagawa (JP); Masaya Katamine, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/870,349

(22) Filed: Jul. 21, 2022

(65) Prior Publication Data
US 2023/0039203 A1    Feb. 9, 2023

(30) Foreign Application Priority Data
Jul. 30, 2021  (JP) .................................. 2021-125014

(51) Int. Cl.
*G01C 21/00*    (2006.01)
(52) U.S. Cl.
CPC ..... *G01C 21/3807* (2020.08); *G01C 21/3833* (2020.08)
(58) Field of Classification Search
CPC ............ G01C 21/3807; G01C 21/3833; G05D 1/0248; G05D 2201/0216; G05D 1/0274
See application file for complete search history.

(56) References Cited

U.S. PATENT DOCUMENTS 6,075,879 A * 6/2000 Roehrig ................. G16H 40/63
                                                                378/37
10,856,850 B2 * 12/2020 Ishida .................. A61B 8/4416
(Continued)

FOREIGN PATENT DOCUMENTS

JP      2010-511957 A    4/2010
KR      101878827 B1    7/2018

OTHER PUBLICATIONS

European Search Report dated Jan. 16, 2023 in corresponding European Application No. 22187153.6.
(Continued)

*Primary Examiner* — Mussa A Shaawat
(74) *Attorney, Agent, or Firm* — VENABLE LLP

(57) ABSTRACT

An information processing apparatus includes: a shape information acquiring unit 204 configured to acquire shape information of a surrounding environment of a moving body measured by a sensor mounted in the moving body; a position and posture acquiring unit configured to acquire position and posture information of the sensor; a correction state acquiring unit configured to acquire a performance state relating to a process of correcting the position and posture information; a priority level determining unit configured to determine a priority level of an area for generating a map; and a map generating unit configured to generate the map on the basis of the shape information and the position and posture information acquired at the time of acquisition of the shape information, in which the map generating unit generates the map in order from an area of which the priority level is high in accordance with the performance state.

13 Claims, 9 Drawing Sheets

(56) References Cited

U.S. PATENT DOCUMENTS

| | | | |
|---|---|---|---|
| 11,561,102 B1* | 1/2023 | Ebrahimi Afrouzi | ........................ G05D 1/0219 |
| 2010/0049366 A1* | 2/2010 | Lee | ...................... G05D 1/0274 700/258 |
| 2012/0157819 A1* | 6/2012 | Jerebko | .................. G16H 50/30 600/407 |
| 2012/0200729 A1* | 8/2012 | Hoda | .................. H04N 23/635 348/222.1 |
| 2012/0253173 A1* | 10/2012 | Endo | ..................... G06T 11/008 600/443 |
| 2014/0037177 A1* | 2/2014 | Endo | ........................ G06T 11/00 382/131 |
| 2020/0245115 A1* | 7/2020 | Dorrance | ............ G08G 1/0141 |
| 2020/0306983 A1 | 10/2020 | Noh et al. | |
| 2021/0063162 A1* | 3/2021 | Moskowitz | ............. G01C 21/28 |
| 2021/0064057 A1* | 3/2021 | Eldar | ................. G01C 21/3602 |
| 2021/0101616 A1* | 4/2021 | Hayat | ..................... G06F 18/21 |
| 2021/0206391 A1* | 7/2021 | Sakano | ................ G06V 20/588 |
| 2021/0365701 A1* | 11/2021 | Eshet | ..................... G06V 20/64 |
| 2022/0066456 A1* | 3/2022 | Ebrahimi Afrouzi | ........................ B25J 9/1697 |
| 2022/0390250 A1* | 12/2022 | An | ..................... G01C 21/3837 |
| 2023/0204386 A1* | 6/2023 | Kitahara | ................ G01C 21/32 701/450 |

OTHER PUBLICATIONS

"ORB-SLAM2: an Open-Source SLAM System for Monocular, Stereo and RGB-D Cameras," IEEE Transactions on Robotics, 2017, vol. 33, No. 5, p. 1255-1262.

\* cited by examiner

INFORMATION PROCESSING APPARATUS, MOVING BODY, METHOD FOR CONTROLLING INFORMATION PROCESSING APPARATUS, AND RECORDING MEDIUM

BACKGROUND OF THE INVENTION

Field of the Invention

The present invention relates to an information processing apparatus, a moving body, a method for controlling an information processing apparatus, and a recording medium.

Description of the Related Art

The field of moving bodies operating in an environment such as a factory or a distribution warehouse such as an unmanned carrier (for example, an automated guided vehicle (AGV)), an autonomous mobile robot (AMR), and the like has attracted attention. An unmanned moving body travels on a set path while estimating its own position. Technologies for generating a map representing shapes of obstacles (hereinafter referred to as a map) using data at the time of traveling in the vicinity of a traveling path have also been proposed.

Japanese Patent Laid-Open No. 2010-511957 (translation of PCT application) discloses a technique for quickly generating a map by detecting movement/non-movement of an object included in a map and selectively reflecting changed environment information including the object that has moved on the original map. In addition, Raul Mur-Artal, Juan D. Tardos, "ORB-SLAM2: an Open-Source SLAM System for Monocular, Stereo and RGB-D Cameras," IEEE Transactions on Robotics, 2017, vol. 33, no. 5, p. 1255-1262, discloses a loop closing technology for correcting deviations in position and posture at the time of performing a process of generating environment map data by moving a moving body in which a sensor is mounted. By using the loop closing technology, the accuracy of the map can be improved.

However, in the technique disclosed in Japanese Patent Laid-Open No. 2010-511957 (translation of PCT application), in a case in which a layout map needs to be regenerated in accordance with a position/posture measurement error of a moving body when loop closing or the like is performed, a delay time for generating a map cannot be reduced.

SUMMARY OF THE INVENTION

The present invention reduces a delay time occurring at the time of generating a map if there is correction of position/posture information of a measurement sensor.

An information processing apparatus according to the present invention includes: a shape information acquiring unit configured to acquire shape information of a surrounding environment of a moving body measured by a sensor mounted in the moving body; a position and posture acquiring unit configured to acquire position and posture information of the sensor; a correction state acquiring unit configured to acquire a performance state relating to a process of correcting the position and posture information; a priority level determining unit configured to determine a priority level of an area for generating a map; and a map generating unit configured to generate the map on the basis of the shape information and the position and posture information acquired at the time of acquisition of the shape information, in which the map generating unit generates the map in order from an area of which the priority level is high in accordance with the performance state.

Further features of the present invention will become apparent from the following description of exemplary embodiments with reference to the attached drawings.

DESCRIPTION OF THE EMBODIMENTS

First Embodiment

In this embodiment, an example in which a method according to this embodiment is applied if an operator moves a moving body manually, in which a sensor measuring shapes of obstacles is mounted, while visually checking a map of a space in which the moving body moves will be described. In this embodiment, an example in which a surrounding embodiment of a running road of a moving body is measured, and a layout map representing shapes of obstacles, buildings, shapes of roads, and the like is generated as the map will be described. In order to prevent leakage of measurement of shapes of obstacles, display of the map needs to be constantly updated during movement of the moving body. In order to update the display of the map in real time, it is necessary to reduce a time (a delay time) until a map of which an error has been corrected is generated after measurement of shape data. Thus, in this embodiment, a priority level used for determining the order of map generation is set for each partial area inside a space that is a map generation target.

Figure 1:
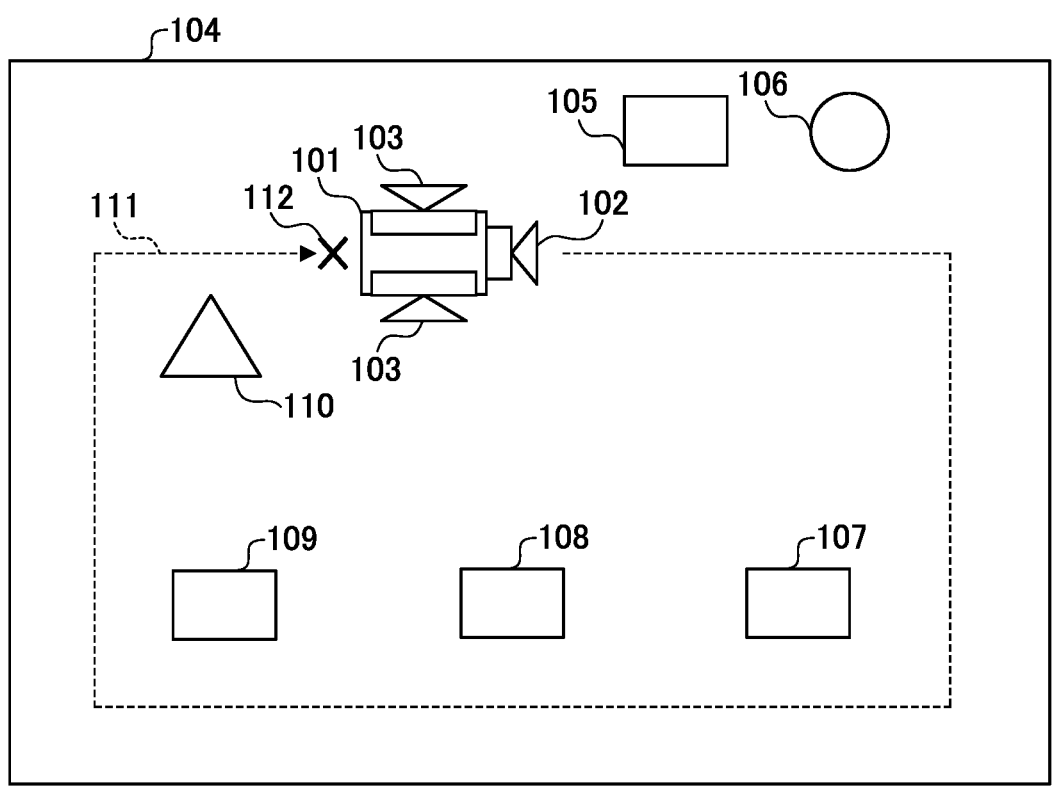
FIG. 1 is a diagram illustrating a traveling environment of a moving body.

FIG. 1 is a diagram illustrating a traveling environment of a moving body. FIG. 1 is illustrated as a schematic view of a space that is a target for generating a map from above. A moving body 101 is a moving body in which a position/posture measurement sensor 102 and a shape measurement sensor 103 are mounted. The position/posture measurement sensor 102 includes a camera and measures a position/posture of the moving body 101. The camera included in the position/posture measurement sensor 102, for example, images and acquires a gray scale image by imaging a surrounding environment of the moving body 101 at a constant frequency (for example, 30 times/second). The shape measurement sensor 103 includes a depth sensor and measures shape information of nearby objects. The shape measurement sensor 103, for example, acquires a distance image at a constant frequency (for example, 30 times/second) on the basis of a result of measurement of a surrounding environment of the moving body 101 acquired using the depth sensor. In this embodiment, two shape measurement sensors 103 are mounted in the moving body 101.

A space 104 is a predetermined space that is a target for generating a map. Obstacles 105, 106, 107, 108, 109, and 110 are obstacles that are present inside the space 104. In measurement of shapes of the obstacles 105 to 110, an operator causes the moving body 101 to travel near the obstacles. For example, a traveling route of the moving body 101 is a course of one cycle starting at a start end place 112, traveling on a traveling path 111 clockwise on FIG. 1, and returning to the start end place 112 again.

Figure 2:
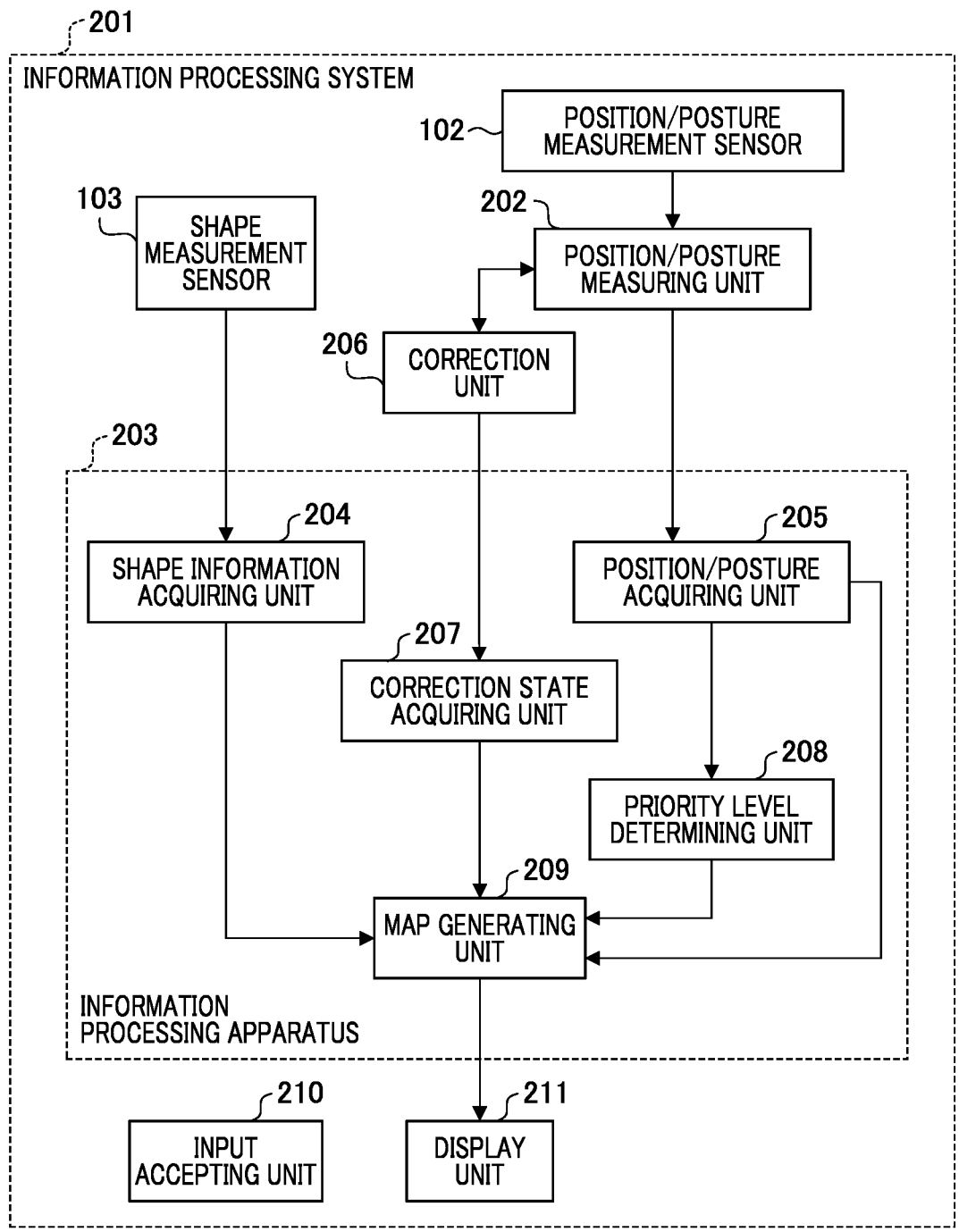
FIG. 2 is a diagram illustrating a configuration of an information processing apparatus according to a first embodiment.

FIG. 2 is a diagram illustrating a configuration of an information processing system including an information processing apparatus according to this embodiment. The information processing system 201 includes a position/posture measurement sensor 102, a shape measurement sensor 103, a position/posture measuring unit 202, a correction unit 206, an information processing apparatus 203, an input accepting unit 210, and a display unit 211. The information processing apparatus 203 includes a shape information acquiring unit 204, a position/posture acquiring unit 205, a correction state acquiring unit 207, a priority level determining unit 208, and a map generating unit 209.

The position/posture measuring unit 202 calculates position/posture information of the shape measurement sensor 103 on the basis of a measurement result acquired by the position/posture measurement sensor 102. More specifically, first, the position/posture measuring unit 202 acquires a position and a posture of the position/posture measurement sensor 102 on the basis of a captured image captured by the position/posture measurement sensor 102. Next, the position/posture measuring unit 202 calculates a position/posture of the shape measurement sensor 103 from the position/posture of the position/posture measurement sensor 102 on the basis of a relative positional relation between the position/posture measurement sensor 102 and the shape measurement sensor 103 that has been set in advance. As a method for acquiring the position/posture of the position/posture measurement sensor 102 from the captured image of the position/posture measurement sensor 102, a known method such as a SLAM technology may be used.

The information processing apparatus 203 generates a map of a surrounding environment to which the moving body 101 moves on the basis of information acquired by the moving body 101. In this embodiment, although the information processing apparatus 203 is described to be included in the moving body 101, the configuration is not limited thereto, and the information processing apparatus 203 may be configured as an external information processing apparatus capable of communicating with the moving body 101. The shape information acquiring unit 204 acquires shape information of obstacles in the vicinity of a traveling path from the shape measurement sensor 103. In this embodiment, a distance image is acquired as the shape information.

The position/posture acquiring unit 205 acquires position/posture information of the shape measurement sensor 103 calculated by the position/posture measuring unit 202 from the position/posture measuring unit 202. In this embodiment, two shape measurement sensors 103 are mounted in the moving body 101, and thus the acquired position/posture information corresponds to the two sensors. The position/posture information represents coordinates values indicating the position of the shape measurement sensor 103 in a coordinate system set in the space 104 and an angle indicating a measurement direction of the shape measurement sensor 103.

The correction unit 206 performs an error correcting process on position/posture information of the shape measurement sensor 103 that has been measured by the position/posture measuring unit 202. The correction state acquiring unit 207 acquires performance state information relating to a process of correcting the position/posture information. In the first embodiment, the correction state acquiring unit 207 acquires information indicating whether or not the process of correcting an error of the position/posture information has been completed from the correction unit 206 as the performance state information. The priority level determining unit 208 determines a priority level of map generation for each partial area inside the space 104 that is a map generation target.

The map generating unit 209 generates a map. The map generating unit 209 generates a map on the basis of shape information acquired by the shape information acquiring unit 204, position/posture information acquired by the position/posture acquiring unit 205, and a priority level determined by the priority level determining unit 208 in accordance with a correction state acquired by the correction state acquiring unit 207. The input accepting unit 210 accepts an input from a user. The display unit 211, for example, is a liquid crystal display or the like and converts data of a map generated by the map generating unit 209 into an image and displays the image. The correction unit 206, the input accepting unit 210, and the display unit 211 may be included in the information processing apparatus 203.

Figure 3:
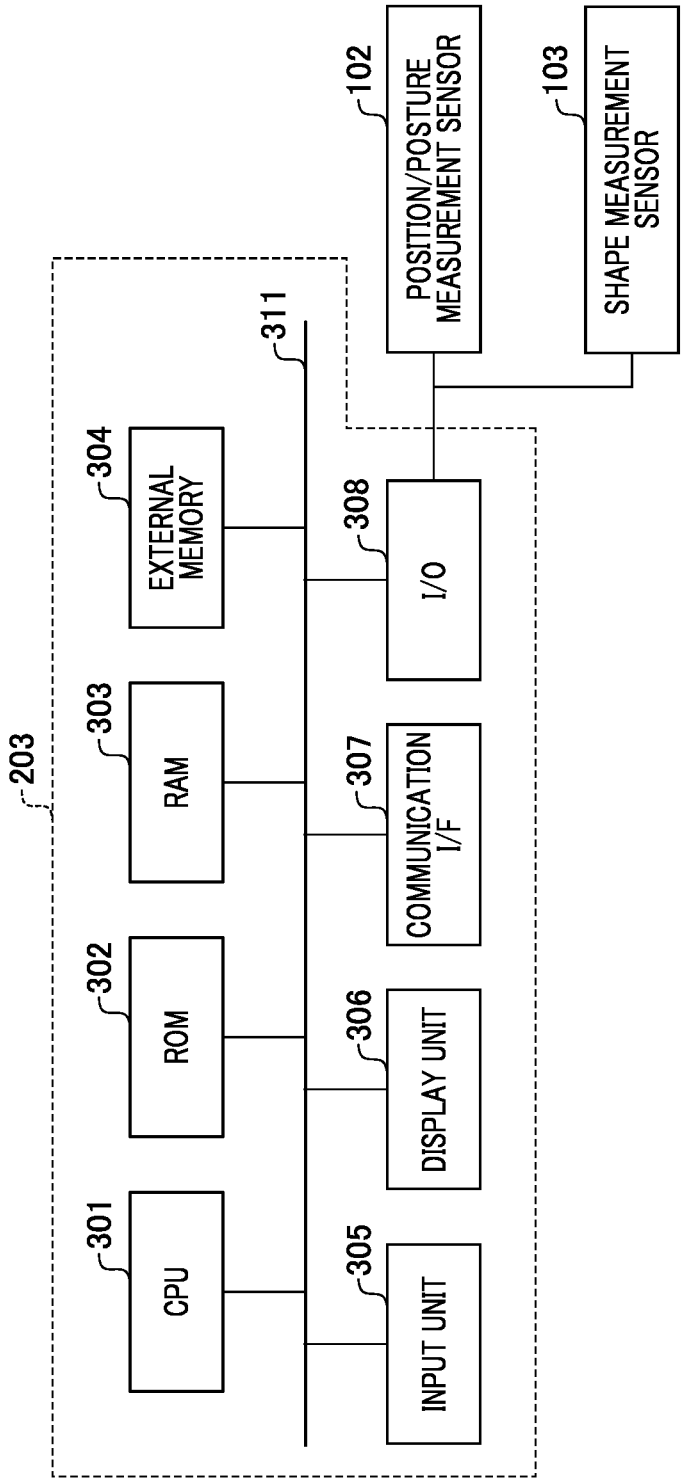
FIG. 3 is a diagram illustrating a hardware configuration of the information processing apparatus.

FIG. 3 is a diagram illustrating a hardware configuration of the information processing apparatus 203. A central processing unit (CPU) 301 controls various devices connected to a system bus 311. A read only memory (ROM) 302 stores a program of a basic input/output system (BIOS) and a boot program. A random access memory (RAM) 303 is used as a main storage device of the CPU 301. An external memory 304 stores a program processed by the information processing apparatus 203.

An input unit 305 is a keyboard, a pointing device, a robot controller, or the like and performs a process of inputting information and the like from a user. A display unit 306 has a display device such as a liquid crystal display or a projector and outputs a calculation result of the information processing apparatus 203 to a display device in accordance with an instruction from the CPU 301 and displays the calculation result on a screen. A communication interface (I/F) unit 307 performs information communication with an external device through a network. The communication of the communication I/F 307 is any type such as Ethernet, USB, serial communication, or radio communication. The network, for example, may be configured as one of a communication network such as a LAN or a WAN, a cellular network (for example, LTE, 5G, or the like), and a radio network, or a combination of these. In other words, the network may be configured such that data can be transmitted and received, and a communication scheme of a physical layer may employ any scheme. A sensor input/output (I/O) 308 is connected to the position/posture measurement sensor 102 and the shape measurement sensor 103 and performs information communication.

Figure 4:
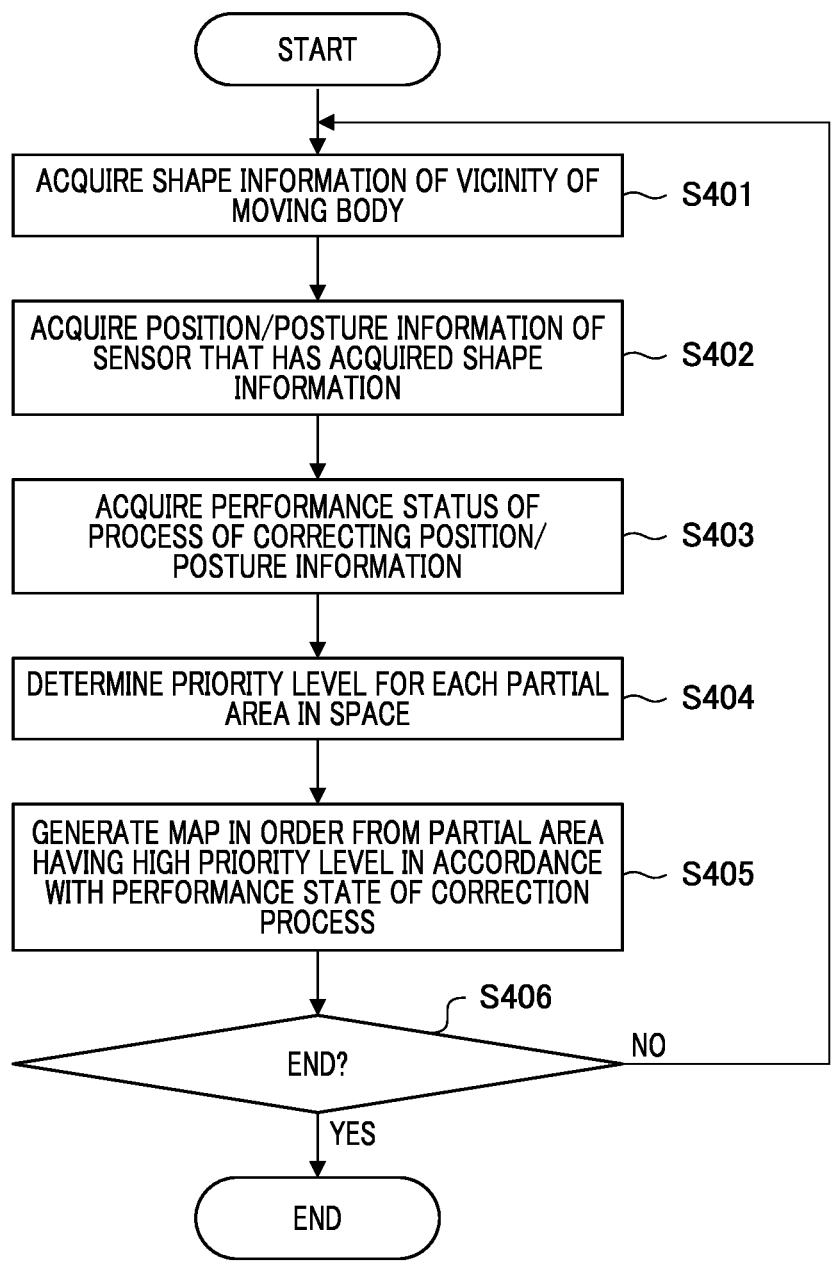
FIG. 4 is a flowchart illustrating a process of the information processing apparatus according to the first embodiment.
Figure 5:
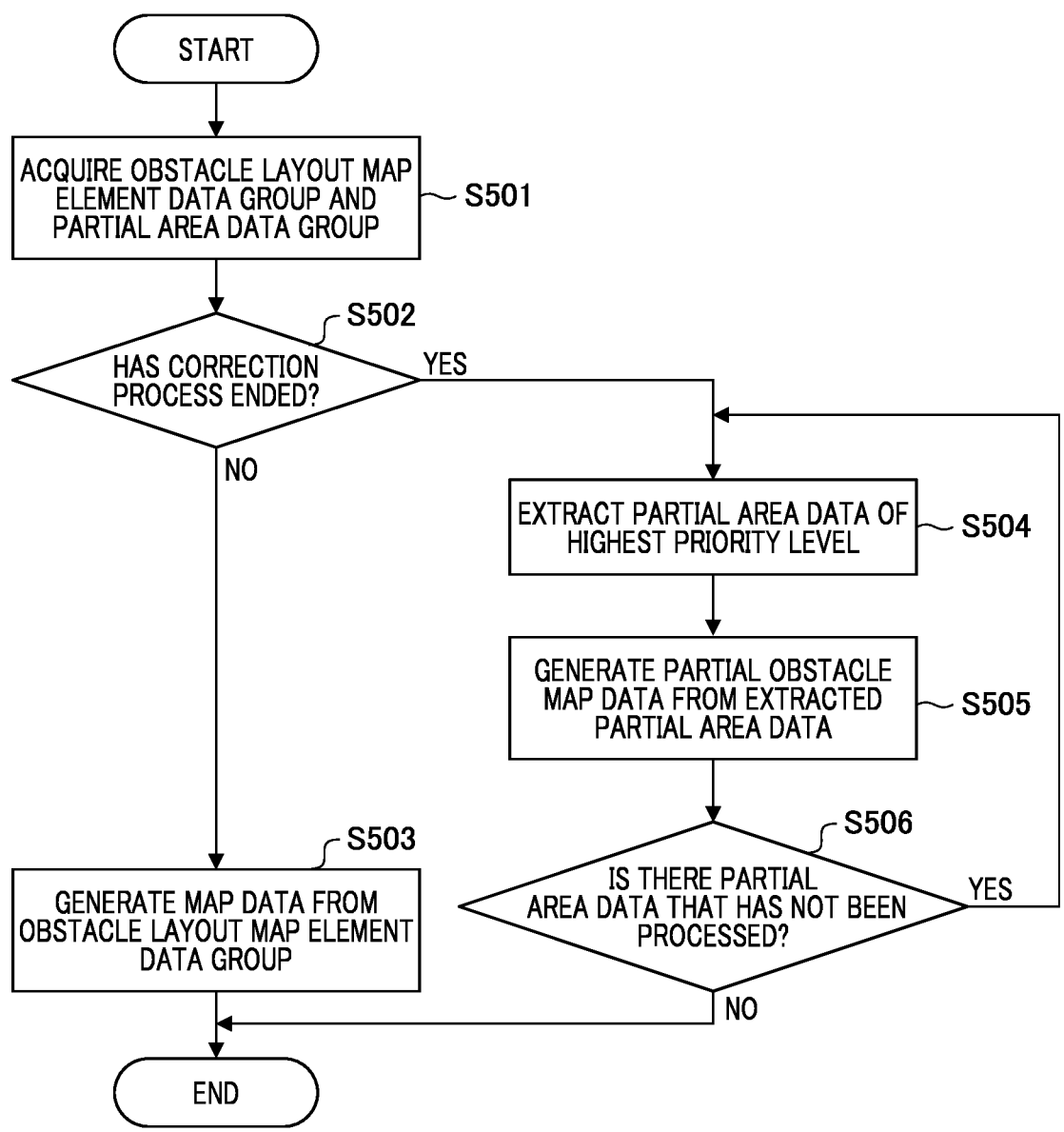
FIG. 5 is a flowchart illustrating a map generating process according to the first embodiment.

Processes of the information processing apparatus 203 according to this embodiment will be described with reference to FIGS. 4 to 6. FIG. 4 is a flowchart illustrating the entire process according to this embodiment that is performed by the information processing apparatus 203. Each process illustrated in FIG. 4 is realized by the CPU 301 of the information processing apparatus 203 calling a program corresponding to each module stored in the ROM 302 or the external memory 304 into the RAM 303 and executing the program.

In Step S401, the shape information acquiring unit 204 acquires shape information of the vicinity of the moving body 101. The shape information, for example, is a distance image according to a result measured by the shape measurement sensor 103 using the depth sensor. The shape information acquired in this step is stored in the RAM 303 in order of acquisition.

In Step S402, the position/posture information of the shape measurement sensor 103 acquired when the shape measurement sensor 103 measures shapes is acquired by the position/posture acquiring unit 205. The position/posture information acquired in this step is corrected position/posture information if a correction process for the position/posture information is performed by the correction unit 206. The data acquired in this step is stored in the RAM 303 in association with the data acquired in Step S401. Hereinafter, shape information and position/posture information that are associated with each other will be referred to as "map element data."

In Step S403, the correction state acquiring unit 207 acquires information representing a performance state of a correction process for correcting error of the position/posture of the shape measurement sensor 103. The performance state information is information indicating whether or not a correction process for correcting an error of the position/posture of the shape measurement sensor 103 has been completed. For example, if the correction process is a loop closed correction process, the correction state information is information indicating whether or not a loop closed correction process has been completed. The correction state acquiring unit 207 acquires performance state information from the correction unit 206.

In Step S404, the priority level determining unit 208 sets a priority level for generating a map for each partial area inside a traveled space. For example, the priority level determining unit 208 generates a data group in which all the map element data groups are sorted in order from the closest to the current position of the moving body 101. Subsequently, the priority level determining unit 208 divides the sorted map element data groups for every predetermined number and stores each map element data group in the RAM 303 as partial area data. At this time, the priority level determining unit 208 may set the number of pieces of data of each map element data group to be uniform. In addition, the priority level determining unit 208 sets a priority level for each piece of partial area data in the order of sorting. The setting of priority levels is not limited thereto, and an example of another priority level setting will be described below.

In Step S405, the map generating unit 209 generates a map. Details of the generation of a map will be described below with reference to FIG. 5. In Step S406, the input accepting unit 210 determines whether or not movement of the moving body 101 is to be ended. More specifically, the input accepting unit 210 determines whether or not an end instruction has been input to the input unit 305 from an operator. If the end instruction has been input from an operator, the movement of the moving body 101 is ended, and this process ends. On the other hand, if the end instruction has not been input from an operator, the process is returned to Step S401.

Details of a map generating process of Step S405 will be described. FIG. 5 is a flowchart illustrating a map generating process according to the first embodiment. Each process represented in FIG. 5 is realized by the CPU 301 of the information processing apparatus 203 calling a program corresponding to each module stored in the ROM 302 or the external memory 304 into the RAM 303 and executing the program.

In Step S501, the map generating unit 209 acquires map element data groups stored in the RAM 303 in Steps S401 and S402 and partial area data groups stored in the RAM 303 in Step S404. In Step S502, the map generating unit 209 determines whether or not a correction process for correcting an error of the position/posture of the shape measurement sensor 103 has finished. More specifically, the map generating unit 209 determines whether or not the correction process has finished on the basis of the performance state information of the correction process that has been acquired by the correction state acquiring unit 207 in Step S403. If it is determined that the correction process has not finished, the process transitions to Step S503. On the other hand, if it is determined that the correction process has not finished, the process transitions to Step S505.

In Step S503, the map generating unit 209 generates map data on the basis of the map element data groups acquired in Step S501. For example, first, the map generating unit 209 calculates coordinates of a three-dimensional point group corresponding to each pixel on the basis of camera parameters in the direction of a capturing position of a distance image for the distance image included in each piece of map element data. Next, the map generating unit 209 extracts a three-dimensional point group of which a distance from the floor face is within a predetermined range and calculates two-dimensional coordinates projected on a plane corresponding to the face of the floor. Then, the map generating unit 209 generates map data corresponding to the calculated two-dimensional coordinates.

If the correction process for correcting an error of the position/posture of the shape measurement sensor 103 has finished, the map generating unit 209 generates map data through processes of Steps S504 to S506. In Steps S504 to S506, map data for each area is generated in order from the highest priority level. In Step S504, the map generating unit 209 extracts partial area data having the highest priority level from the partial area data group acquired in Step S501. In other words, partial area data corresponding to a partial area having the highest priority level is extracted from among partial areas for which the process of generating map data has not been performed.

In Step S505, the map generating unit 209 generates map data of a partial area corresponding to the partial area data having the highest priority level extracted in Step S504. In other words, the map generating unit 209 calculates coordinates of a three-dimensional point group corresponding to each pixel on the basis of camera parameters in the direction of a capture position of a distance image for each distance image belonging to the corresponding partial area. Next, the map generating unit 209 extracts a three-dimensional point group of which a distance from the face of the floor is within a predetermined range and calculates two-dimensional coordinates projected on a plane corresponding to the face of the floor. Then, the map generating unit 209 generates map data of an area having the highest priority level in correspondence with the calculated two-dimensional coordinates.

In Step S506, the map generating unit 209 checks whether there remains partial area data for which the process of generating map data has not been performed in the partial area data group acquired in Step S501. If there is partial area data that has not been processed, the process returns to Step S504, and a map is generated for partial area data having the highest priority level in the remaining partial area. On the other hand, if there is no partial area data that has not been processed, in other words, if the process of generating a map corresponding to all the partial area data has ended, this process ends.

Figure 6B:
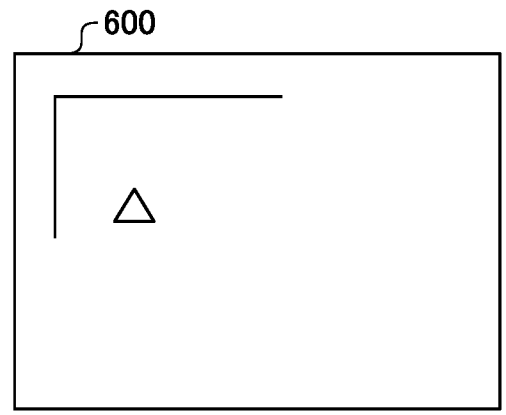
FIGS. 6A to 6D are diagrams illustrating stepped maps in the first embodiment.
Figure 6A:
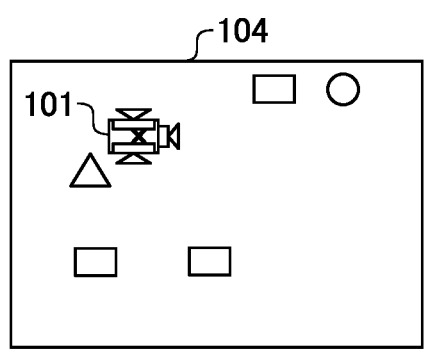
Figure 6C:
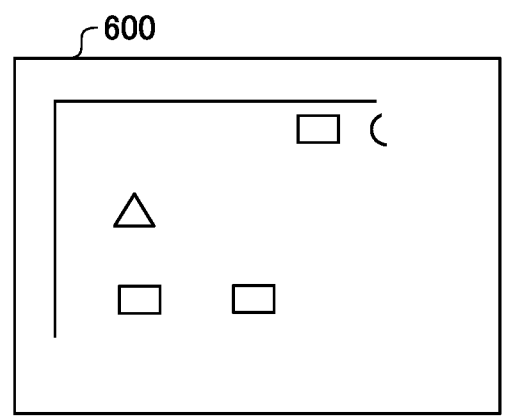
Figure 6D:
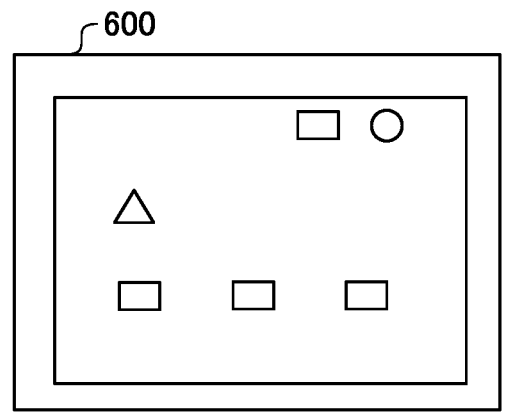

FIGS. 6A to 6D are diagrams illustrating a view in which a map is generated in a stepped manner in the first embodiment. FIG. 6A is a view of the arrangement of a moving body 101 and obstacles in a traveling environment at the time of occurrence of correction of position/posture information from above. As illustrated in FIG. 1, the moving body 101 moves clockwise in a space 104. FIGS. 6B, 6C, and 6D illustrate views in which the map 600 is displayed in a display device included in the display unit 306 in order of time. The map 600 is sequentially generated from a partial area closer to a current position of the moving body 101, and an area in which the map is generated is enlarged in accordance with movement of the moving body 101.

According to this embodiment, even when a loop closed process occurs, by generating a map with priority from the vicinity of the current position of the moving body 101, a delay time occurring when the map is generated can be reduced. In other words, a delay time occurring when a map is generated if there is correction of position/posture information of a measurement sensor can be reduced.

Modified Example of First Embodiment

Although an example in which the shape measurement sensor 103 includes a depth sensor has been described in this embodiment, the configuration is not limited thereto as long as shape information of obstacles can be acquired. For example, a stereo camera or a single-lens camera may be used. If the single-lens camera is used, a distance to an obstacle may be calculated using motion stereo, or a distance may be estimated using a learning model that outputs distance information on the basis of luminance information. In addition, although an example in which two shape measurement sensors 103 are mounted on the moving body 101 on left and right sides with respect to a traveling direction has been described in this embodiment, the arrangement and the number of shape measurement sensors 103 are not limited thereto as long as shapes of surrounding obstacles of the moving body can be measured. For example, the shape measurement sensors may be installed at 45 degrees with respect to a traveling direction or may be installed to look down comprehensively. The number of used shape measurement sensors may be one or three or more. In addition, although an example in which the shape information is a distance image has been described in this embodiment, the configuration is not limited thereto, and, for example, the shape information may be three-dimensional coordinate values of a point group of the surface of an obstacle, or a set of a measurement direction and a distance value to an obstacle in the measurement direction.

Although the method of performing measurement using the SLAM technology on the basis of an image captured by a camera included in the position/posture measurement sensor 102 mounted in the moving body 101 has been described as a method for the position/posture measuring unit 202 to measure a position and a posture in this embodiment, the method is not limited thereto. As the method for measuring a position and a posture, a method capable of measuring a position and a posture of the shape measurement sensor 103 or the moving body 101 in which the shape measurement sensor 103 is mounted may be used. For example, a method of performing measurement using the SLAM technology on the basis of a measured value acquired by a LiDAR or a depth sensor mounted in the moving body 101 may be used, or a position and a direction of the moving body 101 may be calculated on the basis of the number of revolutions of vehicle wheels included in the moving body 101 or an inertial sensor mounted in the moving body 101. Alternatively, a position and a posture may be measured using a magnetic sensor, an optical sensor, a radiowave beacon, GPS, or the like, or a position and a direction of the moving body 101 may be detected from a video of a bird's eye view camera installed in the space 104. Furthermore, the position and the posture may be measured by combining a plurality of the methods described above.

Although an example in which the correction state acquiring unit 207 acquires information of the performance state indicating completion/incompletion of an error correcting process for the position/posture information from the correction unit 206 has been described in this embodiment, information acquired by the correction state acquiring unit 207 may be any information that can be used for determining whether the error correcting process has been performed. For example, the information may be a flag indicating whether or not the position/posture has been changed or a value representing a degree of advancement of the correcting process. If the correction state acquiring unit 207 acquires a value representing a degree of progress of the correcting process in Step S403, it is determined whether or not the degree of progress of the correcting process is equal to or higher than a threshold in Step S502. The correcting process performed by the correction unit 206 may be a process other than a loop closed correction as long as the position/posture information is corrected. For example, the correcting process may be a process of eliminating deviation values of the position and the posture or may be a process of adding position/posture information.

Although an example in which the priority level determining unit 208 sets a high priority level in the vicinity of the current position has been described in this embodiment, the method of setting priority levels is not limited thereto. An area in which a priority level is set may be an area that can be designated on the basis of the position and the posture measure in a traveling path, and, for example, a priority level may be set in accordance with a movement schedule of the moving body 101. More specifically, a high priority level may be set for an area that is present in a direction in which the moving body 101 travels, or positions through which the moving body 101 passes may be predicted, and relatively high priority levels may be set in the vicinity of the predicted positions. In addition, if the position/posture acquiring unit 205 acquires new position/posture information while the map generating unit 209 is generating a map, the priority level may be changed in accordance with a measurement status such as a case in which higher priority levels are set in the partial areas of the vicinity including the newly-acquired position than in the other partial areas. Alternatively, an instruction from a user may be accepted, and a relatively high priority level may be set for a partial area designated by the user. According to this method of setting priority levels, a map can be generated with priority from an area for which a user's request for visual recognition is high.

In addition, a relatively high priority level may be set for a partial area for which a time at which shape information thereof is acquired is close.

An area having a high priority level determined by the priority level determining unit 208 may be set to have a width that is approximately the same as a measurable distance of the shape measurement sensor 103 with the moving body 101 of the partial area set as its center. In addition, an area for which a priority level is set may be limited to a predetermined area, and other areas may be set as non-targets for map generation. According to such a method of setting priority levels, a map can be generated in a shorter time.

In addition, although the number of sets of shape information and position/posture information is set to be constant regardless of partial areas in Step S404 of this embodiment, the configuration is not limited thereto. For example, the number of the sets may be changed in accordance with a use ratio of the CPU 301 and a remaining volume of the RAM 303. More specifically, if the use ratio of the CPU is high, or if the remaining volume of the memory is small, the number of sets of shape information and position/posture information is decreased. In this way, an increase in the delay time relating to map generation can be reduced.

Second Embodiment

In the first embodiment, an embodiment in which, if the process of correcting a position and a posture has been completed, generation of a map advances in accordance with a priority level of each partial area has been described. In a second embodiment, an embodiment in which the process of correcting a position and a posture is also performed in order from the highest priority level in addition to the generation of a map will be described.

Figure 7:
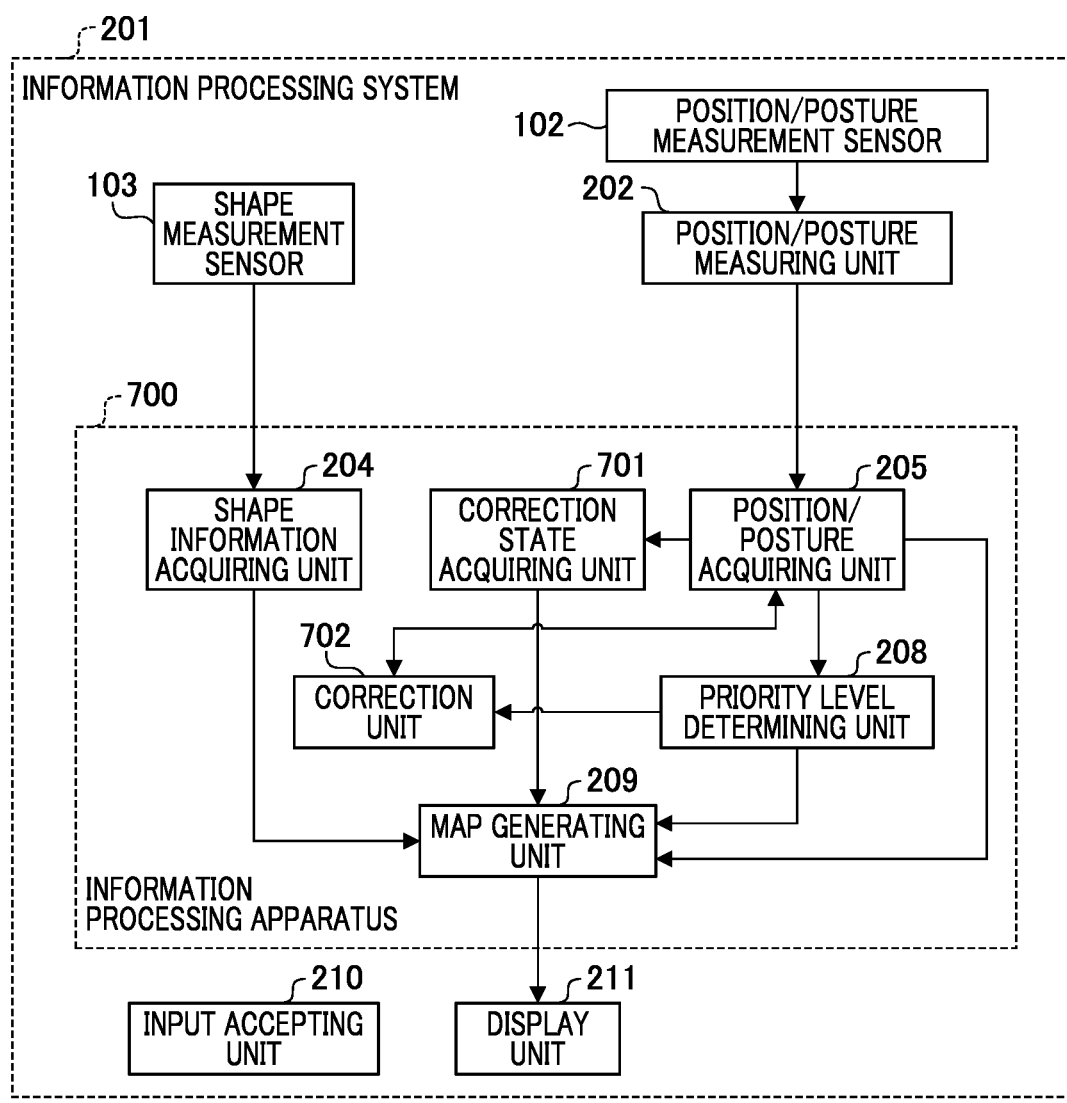
FIG. 7 is a diagram illustrating a configuration of an information processing apparatus according to a second embodiment.

A configuration of an information processing system according to this embodiment will be described with reference to FIG. 7. FIG. 7 is a diagram illustrating a configuration of an information processing apparatus according to the second embodiment. The information processing system 201 according to this embodiment includes a position/posture measurement sensor 102, a shape measurement sensor 103, a position/posture measuring unit 202, an information processing apparatus 700, an input accepting unit 210, and a display unit 211. The information processing apparatus 700 includes a shape information acquiring unit 204, a position/posture acquiring unit 205, a correction state acquiring unit 701, a correction unit 702, a priority level determining unit 208, and a map generating unit 209. In FIG. 7, the same reference numerals will be assigned to the same components as those according to the first embodiment, and description thereof will be omitted. The input accepting unit 210 and the display unit 211 may be included in the information processing apparatus 700.

The correction state acquiring unit 701 acquires information indicating whether an error correcting process for position/posture information can be performed. Here, the error correcting process for position/posture information is loop closed correction. In addition, whether or not the error correcting process can be performed is determined on the basis of whether or not a position and a posture acquired by the position/posture acquiring unit 205 are close to any one of acquired position/position groups, in other words, whether or not a movement path of a moving body 101 forms a loop.

If a correction state acquired by the correction state acquiring unit 701 is a state in which the error correcting process for position/posture information can be performed, the correction unit 702 performs the error correcting process for the position/posture. At this time, the correction unit 702 performs the error correcting process in order from a position and a posture included in a partial area having a higher priority level on the basis of position/posture information acquired by the position/posture acquiring unit 205 and partial area information to which priority levels set by the priority level determining unit 208 are attached.

Figure 8:
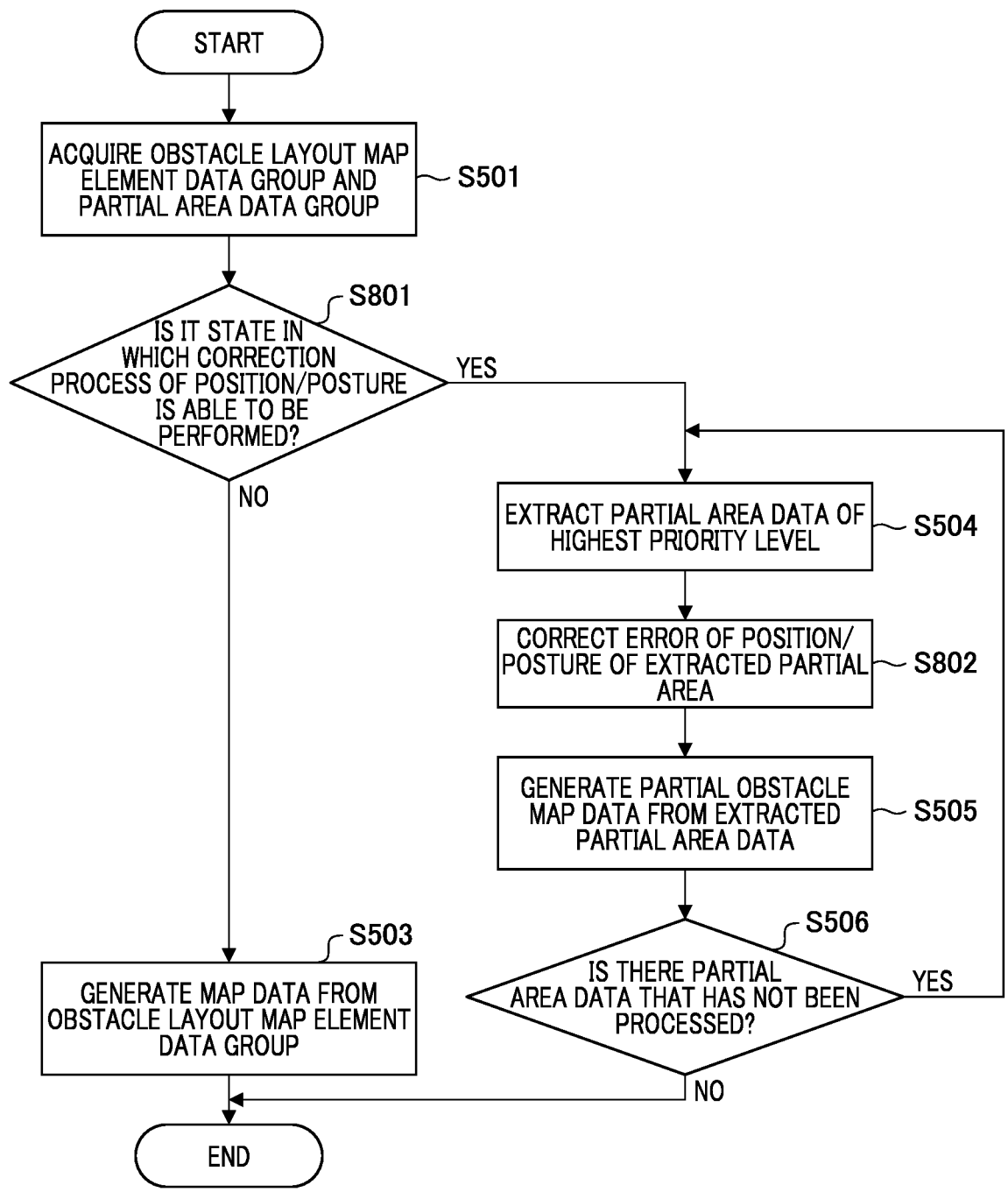
FIG. 8 is a flowchart illustrating a map generating process according to the second embodiment.

The entire process according to this embodiment that is performed by the information processing apparatus 203 is similar to that according to the first embodiment (FIG. 4). In addition, all the position/posture information acquired in Step 402 of the second embodiment is position/posture information on which the correction process for the position/posture information has not been performed by the correction unit 702. Details of a map generating process performed in Step 405 of the second embodiment will also be described with reference to FIG. 8. FIG. 8 is a flowchart illustrating the map generating process according to the second embodiment. Each process represented in FIG. 8 is realized by the CPU 301 of the information processing apparatus 203 calling a program corresponding to each module stored in the ROM 302 or the external memory 304 into the RAM 303 and executing the program. In FIG. 8, the same reference signs as those represented in FIG. 5 will be assigned to processes similar to those according to the first embodiment, and description thereof will be omitted.

In Step S501, after map element data groups and partial area data groups are acquired, the process transitions to Step S801. In Step S801, the map generating unit 209 acquires information indicating whether or not a correction process for the position/posture information can be performed from the correction state acquiring unit 701. If a loop closed process that is a correction process according to this embodiment cannot be performed, the process transitions to Step S503. On the other hand, if the loop closed process can be performed, the process transitions to Step S504.

If the correction process for the position/posture information can be performed, the map generating unit 209 generates map data by performing processes of Steps S504, S802, S505, and S506. In Steps S504, S802, S505, and S506, a position/posture correcting process and a map data generating process are performed for each area in order from the highest priority level.

In Step S504, when the partial area data having the highest priority level is acquired, the process transitions to Step S802. In Step S802, the correction unit 702 performs a local loop closed correcting process for correcting an error of position/posture information on a corresponding partial area on the basis of the position/posture information included in the partial area data having a high priority level extracted in Step S505. After the correcting process is performed, the process transitions to Step S505, and a map is generated on the basis of the partial area data having the high priority level extracted in Step S505 and the data corrected in Step S802.

As described above, according to this embodiment, error correction of the position/posture information can be performed for each partial area in addition to generation of a map for each partial area, and a delay time occurring when a map is generated can be reduced. Thus, a delay time occurring when a map is generated if there is correction of the position/posture information acquired by the measurement sensor can be reduced.

Modified Example of Second Embodiment

In an area that is corrected with priority by the correction unit 702 in Step S802, an area having the highest priority level for generating a map that is determined by the priority level determining unit 208 may be included. For this reason, a priority level of an area corrected by the correction unit 702 may be a priority level determined using a method other than priority levels determined by the priority level determining unit 208. For example, for an area larger than the range of a partial area determined by the priority level determining unit 208, a priority level of correction performed by the correction unit 702 may be set.

Third Embodiment

In this embodiment, a method for notifying of a result of map generation if a map is generated in a stepped manner according to the first embodiment or the second embodiment and performing a parameter setting function related to the map generation will be described.

Figure 9:
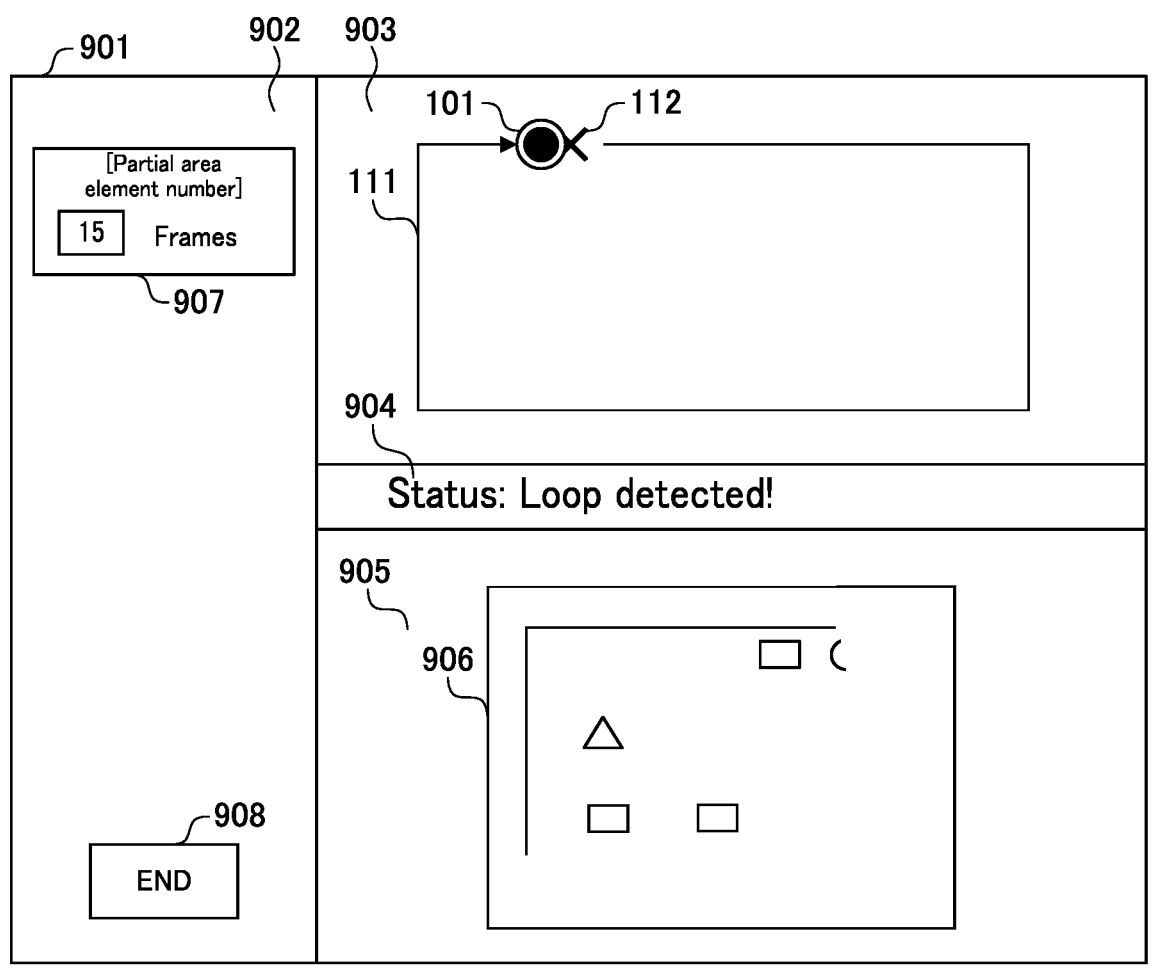
FIG. 9 is a diagram illustrating a result notification of a map and a parameter setting.

FIG. 9 is a diagram illustrating notification of a result of map generation and parameter setting. On a GUI screen 901, a map being generated and a graphical user interface (GUI) used for setting parameters relating to generation of a map are displayed. For example, the GUI screen 901 is displayed on a touch panel in which a display unit 306 and an input unit 305 are integrated. The GUI screen 901 is displayed in a display unit 306 by a display unit 211, and an input accepting unit 210 accepts an instruction for the GUI screen 901 from a user.

The GUI screen 901 has a parameter setting area 902, a traveling history display area 903, a correction state display area 904, and a map display area 905. In the parameter setting area 902, parameters relating to current map generation are displayed, and a user can select a setting item they desire to set and set a parameter. For example, a user presses an element number setting icon 907 and designates the number of pieces of data (the number of elements) of a map corresponding to the range of a partial area. A priority level determining unit 208 determines a partial area to which a priority level is set such that the number of pieces of data designated by the user is included. In addition, by pressing an end icon 908, a user instructs end of generation of a map.

The traveling history display area 903 is a plan view representing a history of positions corresponding to a traveling path 111 in which a moving body 101 has traveled. The correction state display area 904 is an area in which a performance state of a correction process for a position and a posture acquired by a correction state acquiring unit 207 is displayed. The display of the correction state display area 904 illustrated in FIG. 9 indicates that a loop closed correcting process can be started. The map display area 905 is an area in which a map 906 generated by a map generating unit 209 is displayed. The map 906 is displayed in a stepped manner in order from a partial area in which the map has been generated.

As described above, according to this embodiment, input of parameters for controlling map generation and perception of a status of the map generation can be intuitively performed using the GUI.

Modified Example of Third Embodiment

Although the entire partial map that has been generated is displayed in the map display area 905 in this embodiment, the method is not limited to this display method as long as a map of a partial area is displayed. For example, only a local area of a part of the partial map that has been generated may be enlarged and displayed. Particularly, by displaying the vicinity of the current position of the moving body 101 in an enlarged scale, if there is measurement leakage of an obstacle shape, an operator can be easily aware of the measurement leakage.

A parameter used for determining the range of a partial area inside the space 104 that is set in the parameter setting area 902 may be a parameter other than the number of elements of the map. For example, the number of elements of the map may be stored in the information processing apparatus in association with a plurality of modes, and a mode may be configured to be able to be designated in the parameter setting area 902. In addition, a priority level corresponding to variations in the priority level setting method described in the modified example of the first embodiment may be configured to be able to be set. For example, a mode in which a partial area present in the vicinity of the current position is prioritized or a mode in which a partial area of positions on a scheduled traveling path is prioritized may be configured to be able to be designated.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-125014, filed Jul. 30, 2021 which is hereby incorporated by reference wherein in its entirety.

What is claimed is:

1. An information processing apparatus comprising:
at least one processor and memory holding a program which makes the processor function as:

a shape information acquiring unit configured to acquire shape information of a surrounding environment of a movable apparatus measured by a sensor mounted in the movable apparatus;

a position and posture acquiring unit configured to acquire position and posture information of a sensor mounted in the movable apparatus;

a state acquiring unit configured to acquire a processing state relating to a process of correcting the position and posture information due to the movable apparatus revisiting a position already acquired by the position and posture acquiring unit;

a determining unit configured to determine an area to generate a map with priority; and a map generating unit configured to generate the map from the area determined by the determining unit on the basis of the shape information, the position and posture information acquired at the time of acquisition of the shape information, and the processing state.

2. The information processing apparatus according to claim 1, wherein the determining unit determines an area close to a current position of the sensor as the area for which the map is generated with priority on the basis of the position and posture information.

3. The information processing apparatus according to claim 1, wherein the determining unit determines the area for which the map is generated with priority in correspondence with a movement schedule of the movable apparatus.

4. The information processing apparatus according to claim 1, wherein the determining unit determines the area for which the map is generated with priority in accordance with a user's instruction.

5. The information processing apparatus according to claim 1, wherein the determining unit determines an area including a position of the sensor acquired at the time of acquisition of the shape information to be the area for which the map is generated with priority if the shape information acquiring unit acquires the shape information during generation of the map.

6. The information processing apparatus according to claim 1,
wherein the processing state is information indicating whether or not a process of correcting the position and posture information has finished, and
wherein the map generating unit generates the map from the area determined by the determining unit if the process of correcting the position and posture information has finished.

7. The information processing apparatus according to claim 1,
wherein the processor further functions as a correction unit configured to perform a process of correcting the position and posture information acquired by the position and posture acquiring unit,
wherein the processing state is information indicating whether or not the process of correcting the position and posture information is able to be performed, and
if the process of correcting the position and posture information is able to be performed,
the correction unit performs the process of correcting the position and posture information in accordance with the priority, and
the map generating unit generates the map from the area determined by the determining unit on the basis of the shape information and the position and posture information corrected by the correction unit.

8. The information processing apparatus according to claim 1, wherein the processor further functions as a display unit configured to display the map generated by the map generating unit and a Graphical User Interface (GUI) used for setting parameters relating to the generation of the map in a display device.

9. The information processing apparatus according to claim 1, wherein the correcting process is loop closed correction.

10. The information processing apparatus according to claim 1, wherein the map generating unit generates the map by gradually expanding the area from the area determined by the determination unit to surrounding areas.

11. An information processing system comprising:
a shape measurement sensor mounted in a movable apparatus and configured to measure a shape of a surrounding environment of the movable apparatus;
a position and posture measurement sensor mounted in the movable apparatus and configured to measure position and posture information of the position and posture measurement sensor;
at least one processor and memory holding a program which makes the processor function as:
a shape information acquiring unit configured to acquire shape information of the surrounding environment of the movable apparatus measured by the shape measurement sensor;
a position and posture acquiring unit configured to acquire position and posture information of the position and posture measurement sensor;
a state acquiring unit configured to acquire a processing state relating to a process of correcting the position and posture information;
a determining unit configured to determine an area to generate a map with priority; and
a map generating unit configured to generate the map from the area determined by the determining unit on the basis of the shape information, the position and posture information acquired at the time of acquisition of the shape information, and the processing state; and
a display device configured to display a map generated by the map generating unit.

12. A control method of an information processing apparatus, the control method comprising:
acquiring shape information of a surrounding environment of a movable apparatus measured by a sensor mounted in the movable apparatus;
acquiring position and posture information of a sensor mounted in the movable apparatus;
acquiring a processing state relating to a process of correcting the position and posture information due to the movable apparatus revisiting a position already acquired by the acquiring position and posture information;
determining an area to generate a map with priority; and
generating the map from the area determined by the determining on the basis of the shape information, the position and posture information acquired at the time of acquisition of the shape information, and the processing state.

13. A non-transitory recording medium storing a control program of an information processing apparatus causing a computer to perform each step of a control method of the information processing apparatus, the method comprising:

acquiring shape information of a surrounding environment of a movable apparatus measured by a sensor mounted in the movable apparatus;
acquiring position and posture information of a sensor mounted in the movable apparatus;
acquiring a processing state relating to a process of correcting the position and posture information due to the movable apparatus revisiting a position already acquired by the acquiring position and posture information;
determining an area to generate a map with priority; and
generating the map from the area determined by the determining on the basis of the shape information, the position and posture information acquired at the time of acquisition of the shape information and the processing state.

* * * * *